United States Patent
Miñano et al.

(10) Patent No.: US 11,388,389 B2
(45) Date of Patent: *Jul. 12, 2022

(54) VISUAL DISPLAY WITH TIME MULTIPLEXING FOR STEREOSCOPIC VIEW

(71) Applicant: Tesseland LLC, Glendale, CA (US)

(72) Inventors: Juan Carlos Miñano, Madrid (ES); Pablo Benítez, Madrid (ES)

(73) Assignee: TESSELAND, LLC, Glendale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/619,648

(22) PCT Filed: Jun. 22, 2018

(86) PCT No.: PCT/US2018/038992
§ 371 (c)(1),
(2) Date: Dec. 5, 2019

(87) PCT Pub. No.: WO2018/237263
PCT Pub. Date: Dec. 27, 2018

(65) Prior Publication Data
US 2020/0204789 A1    Jun. 25, 2020

Related U.S. Application Data

(60) Provisional application No. 62/523,473, filed on Jun. 22, 2017.

(51) Int. Cl.
G02B 5/04 (2006.01)
H04N 13/341 (2018.01)
(Continued)

(52) U.S. Cl.
CPC ......... H04N 13/341 (2018.05); G02B 3/0006 (2013.01); H04N 13/161 (2018.05); H04N 13/344 (2018.05)

(58) Field of Classification Search
CPC ............. G02B 3/0037; G02B 27/0172; G02B 27/2264; G02B 27/017; G02B 5/04;
(Continued)

(56) References Cited

U.S. PATENT DOCUMENTS 5,390,047 A    2/1995  Mizukawa
6,529,331 B2   3/2003  Massof et al.
(Continued)

FOREIGN PATENT DOCUMENTS

JP    2013-044896 A    3/2013
KR    20020010966 A    2/2002
(Continued)

OTHER PUBLICATIONS

Cheng et al. "Large field-of-view and high resolution free-form head-mounted display", Proc, SPIE 7652, Internationak Optical Design Conference 2010, dated Sep. 2, 2010, 14 pages.
(Continued)

*Primary Examiner* — Patrick E Demosky
(74) *Attorney, Agent, or Firm* — Faegre Drinker Biddle & Reath LLP

(57) ABSTRACT

A display device includes a display operable to generate a real image and an optical system including: a plurality of optical channel bundles, each bundle comprising one or more channels, each channel comprising a lenslet arranged to generate a sub-image from a respective partial real image on the display, Each lenslet is configured to project light from the display to a corresponding eye position among two eye positions. The sub-images combine to form two virtual images so that different optical channel bundles image a (Continued)

same portion of the display to different portions of the virtual images. The optical system is configured to allow light to flow through selected channels and prevent, light from flowing through other selected channels. The system successively opens the optical channel bundles and displays partial real images associated with the channels of the corresponding optical channel bundle.

27 Claims, 9 Drawing Sheets

(51) Int. Cl.
    *H04N 13/344* (2018.01)
    *H04N 13/161* (2018.01)
    *G02B 3/00* (2006.01)
(58) Field of Classification Search
    CPC ...... G02B 2027/011; G02B 2027/0147; G02B 2027/0123; H04N 13/344; H04N 13/341; H04N 13/332; H04N 13/339; G06T 15/00
    See application file for complete search history.

(56) References Cited

U.S. PATENT DOCUMENTS

| | | | |
|---|---|---|---|
| 9,201,270 B2 | 12/2015 | Fattal et al. | |
| 10,432,920 B2 | 10/2019 | Benitez et al. | |
| 10,436,951 B2 | 10/2019 | Benitez et al. | |
| 10,459,126 B2* | 10/2019 | Minano | G02B 25/001 |
| 10,663,626 B2 | 5/2020 | Benitez et al. | |
| 10,690,813 B2 | 6/2020 | Benitez et al. | |
| 10,782,453 B2 | 9/2020 | Benitez et al. | |
| 2002/0015233 A1 | 2/2002 | Park | |
| 2004/0070855 A1 | 4/2004 | Benitez et al. | |
| 2004/0108971 A1 | 6/2004 | Waldern et al. | |
| 2007/0024968 A1 | 2/2007 | Kim et al. | |
| 2008/0049152 A1 | 2/2008 | Hong et al. | |
| 2010/0277575 A1 | 11/2010 | Ismael et al. | |
| 2013/0187836 A1* | 7/2013 | Cheng | G02B 5/04 345/8 |
| 2014/0176528 A1* | 6/2014 | Robbins | H04N 13/302 345/419 |
| 2014/0320843 A1 | 10/2014 | Streuber et al. | |
| 2017/0171533 A1 | 6/2017 | Benitez et al. | |

FOREIGN PATENT DOCUMENTS

| | | |
|---|---|---|
| KR | 10-2013-0057374 A | 5/2013 |
| WO | 2016-118640 A1 | 7/2016 |

OTHER PUBLICATIONS

Bruckner, "Microoptical Multi Aperture Imaging Systems", Ph.D. Thesis dissertation Friedrich Schiller University, Jena, Germany, http://www.db-thueringen.de/servlets/DerivateServlet/Derivate-24992/br%C3%BCckner/dissertation_a_brueckner_Multi_Aperture_Imaging_Systems_2011_12_22.pdf, 142 pages (2010).
Bruckner et al., "Thin wafer-level camera lenses inspired by insect compound eyes", Optics Express, vol. 18, No. 24, pp. 24379-24394, 16 pages, Nov. 22, 2010.
Chen, "Wide field of view, wide spectral band off-axis helmet-mounted display optical design", International Optical Design Conference 2002, Proceedings of SPIE vol. 4832; 6 pages (2002).
Cheng et al., "Design of a wie-angle, lightweight head-mounted display using free-form optics tiling", Optical Letters/vol. 36, No. 11, pp. 2098-2100, 3 pages, Jun. 1, 2011.
Curcio, et al., "Human photoreceptor topography", The Journal of Comparative Neurology, pp. 497-523, 28 pages, Feb. 1990.
Droessler et al.,"Tilted cat helmet-mounted display", Optical Engineering, 29 (8), pp. 849-854 (1990).
Fattal et al., "A multi-directional backlight for a wide-angle, glasses-free three-dimensional display", Nature, vol. 495, pp. 348-351, Mar. 21, 2013.
Huang et al., "The Light Field Stereoscope", Stanford Computational Imaging Lab, SIGGGRAPH2015, 10 pages, (2015).
Huang et al., "Eyeglasses-free Display: Towards Correcting Visual Aberrations with Computational Light Field Displays", 12 pages, (2012).
Huang et al., "The Light Field Stereoscope, Immersive Computer Graphics via Factored Near-Eye Light Field Displays with Focus Cues", ACM Transactions on Graphics (SIGGRAPH), 12 pages (2015).
Ker, "Visual resolution in the periphery", Perception & Psychophysics, vol. 9, (3B), 375-386, 4 pages (1971).
Lambooij et al., "Visual Discomfort and Visual Fatigue of Stereoscopic Displays: A Review", Journal of Imaging and Science Technology, 53(3), 14 pages (Apr. 23, 2009).
Lanman et al., "Near-Eye Light Field Displays", NVIDIA Research, ACM SIGGRAPH 2013, Emerging Technologies, 10 pages, Jul. 2013.
Liu et al., "Near eye light field display based on human visual features", Optics Express, vol. 25, No. 9, http://doi.org/10.1364/OE.25.009886, 15 pages (Apr. 20, 2017).
Melzer, "Overcoming the Field of View: Resolution Invariant In Head Mounted Displays", Proc. of SPIE vol. 3362, Helmet- and Head-Mounted Displays III, ed. RJ Lewandowski, L A Haworth, H J Girolamo, 10 pages, pp. 284-293 (Jul. 1998).
Pablo, "More on the kappa angle of the human eye: average values and variability", Pablo Artal Blog, http://.pabloartal.blogspot.com/2013/09/more-on-kappa-angle-of-human-eye.html#:~:text=In average%2C angle kappa is,degrees in the temporal direction., 3 pages, dated Sep. 15, 2013.
Peli, "Visual and Optometric Issues with Head-Mounted Displays", IS&T/OSA Optics & Imaging in the Information Age, Published by The Society for Imaging Science and Technology, pp. 364-369, 6 pages, 1996.
Rolland et al., "Head-Mounted Display Systems", Encyclopedia of Optical Engineering DOI:10.1081/E-EOE-120009801, 14 pages (2005).
Rolland, J.P.,"Wide-angle, off-axis, see-through head-mounted display", Univ. of Florida, STARS, https://stars.library.ucf.edu/facultybib2000/2774?utm_source=stars.libary.ucf.edu%2Ffacultybib2000%2F2774&utm_medium=PDF&utm_campaign=PDFCoverPages, pp. 1760-1769, 9 pages, Jan. 1, 2000.
J. Duparre and R. Volkel, "Novel Optics/Micro Optics for Miniature Imaging Systems", Proc. SPIE 6196, Photonics in Multimedia, doi:10 1117/12.662757, 15 pages (Apr. 21, 2006).
G. Kramida, "Resolving the vergence-accommodation conflict in head-mounted displays", IEEE Transactions on Visualization and Computer Graphics, vol. 22, No. 7, pp. 1912-1931 (2016).
ISR/Written Opinion dated Oct. 19, 2018 in corresponding International Appl. No. PCT/US2018/038992.

* cited by examiner

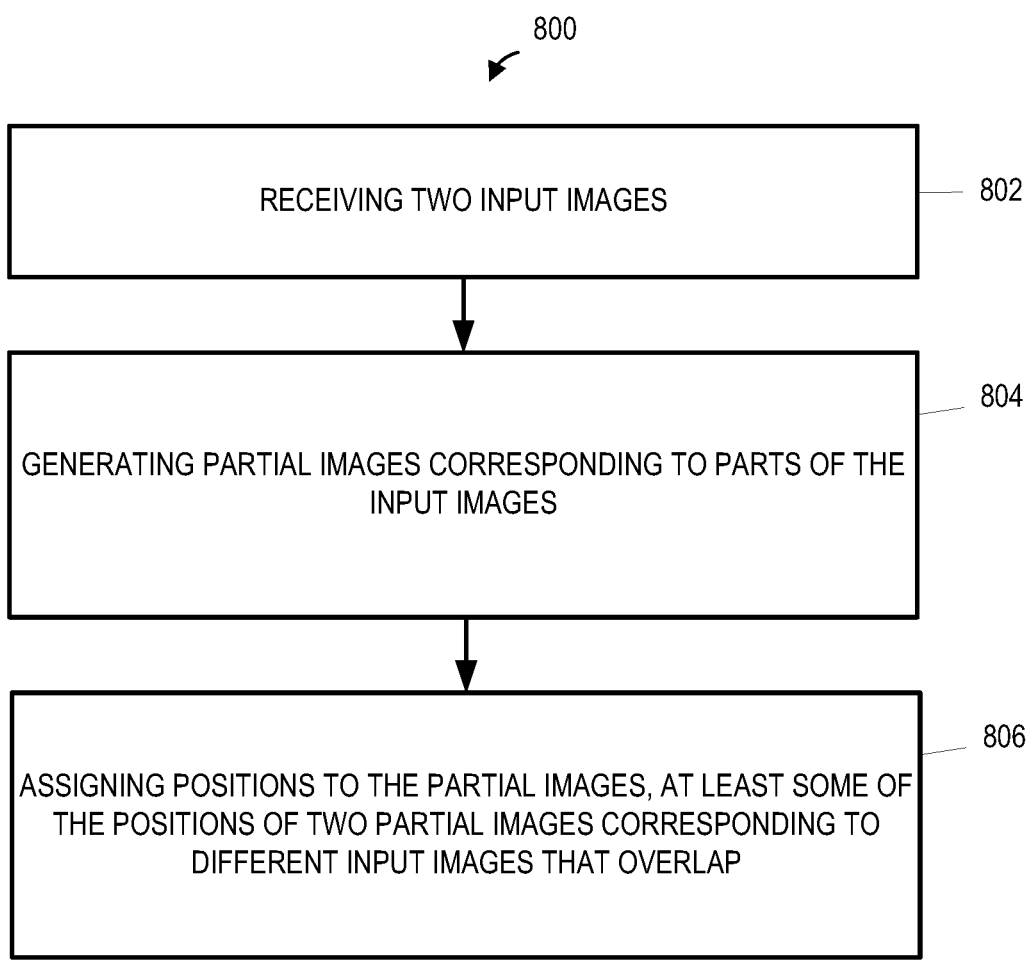

VISUAL DISPLAY WITH TIME MULTIPLEXING FOR STEREOSCOPIC VIEW

TECHNICAL FIELD

The application relates to visual displays, and especially to head-mounted display technology.

DEFINITIONS

The following definitions are used throughout the specification.

| | |
|---|---|
| channel | Each one of the individual optical devices of the optics array, which collects light from the digital display and projects it to an eye sphere continuously. Each channel may be formed by one or more optical surfaces. There is one channel per cluster. The channel is designed to form a continuous image of its cluster's o-pixels into i-pixels. In time multiplexing and when shutters are used, there is usually one shutter per channel. |
| Channel bundle | Set of channels that are open during the same sub-frame slots. When shutters are used, the channels of the same channel bundle may share the same shutter or may have synchronous shutters. |
| cluster | Set of o-pixels that illuminates the pupil range through a given channel and, in time multiplexing, at the same sub-frame slot. O-pixels belonging to the same cluster are adjacent one to another. The number of clusters is equal to the number of channels. In time multiplexing, clusters of different sub-frame slots may intersect. |
| digital display | Component (typically electronic) that modulates the light (typically the illuminance), which can be self-emitting (e.g. an OLED display) or externally illuminated by a front or a backlight system (e.g. an LCD or an LCOS). The modulation is typically both temporal (image may change with time) and spatial (image may change with the position on the digital display). Some special digital displays (such as Light Field Displays) do also angular modulation in addition to the temporal and spatial modulations. |
| eye pupil | Image of the interior iris edge of the eye through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of rotation of the eye and with radius equal to the average distance of the eye pupil to that center (typically 13 mm). For practical reasons in designing the apparatus, the eye, and other parts of the viewer, are represented by typical dimensions of an adult human being at an intended position relative to the apparatus. |
| field of view or FOV | Angular region within the horizontal and vertical full angles subtended by the virtual screen from the eye pupil center when the two eyes rest looking frontwards. |
| frame time | Period of time during which a complete set of sub-frames forming an image is shown once. Also called frame time, or frame display time. |
| guard | Corridor between adjacent clusters of the digital display that does not contain active o-pixels. The guard avoids optical cross-talk while guaranteeing a certain tolerance for the optics positioning. |
| human angular resolution | Minimum angle subtended by two point sources which are distinguishable by an average perfect-vision human eye. The angular resolution is a function of the peripheral angle and of the illumination level. |
| i-pixel | Virtual image of the o-pixels belonging to the same web. Preferably, this virtual image is formed at a certain distance from the eye (from 2 m to infinity). It can also be considered as a pixel of the virtual screen seen by the eye. When using a Light Field Display as digital display, the i-pixels will not generally be at a fixed distance from the eye, and that distance may vary from frame to frame. |
| main chief ray | Ray passing through the center of the exit pupil aperture of a channel towards the center of the eye pupil when the eye pupil is positioned so the angle between the gaze vector and that ray is a minimum among all possible positions within the pupil range of that channel. |
| Open channel | In time multiplexing, channel which is imaging its cluster into an eye. When shutters are used, an open channel is a channel whose shutter is open. When there is no time multiplexing any channel is an open channel. |
| open cluster | In time multiplexing, cluster which is imaged on the virtual screen during a sub-frame slot through an open channel. When shutters are used, the open clusters are those whose shutter is open. The channel of an open cluster is an open channel. When there is no time multiplexing any cluster is an open cluster. The intersection of any two open clusters of the same sub-frame slot is the empty set and the union of all open clusters of the same sub-frame slot plus the inactive area is the whole digital display. |
| o-pixel | Physical pixel of the digital display. There are active o-pixels, which are lit to contribute to the displayed image, and inactive o-pixels, which are never lit. When an active o-pixel is lit, a substantial fraction of its lit rays impinge on the eye sphere inside the pupil range of its cluster's channels. If an |

| | |
|---|---|
| | inactive o-pixel were lit, its light rays would impinge on the eye sphere outside the pupil range. An inactive o-pixel can be physically nonexistent, for instance, because the display lacks at that o-pixel position at least one necessary hardware element (OLED material, electrical connection) to make it functional, or it can be unaddressed by software. The use of inactive o-pixels reduces the power consumption and the amount of information to be managed. Every active o-pixel belongs to a single open cluster and to a single web during a sub-frame slot. |
| optical cross-talk | Undesired situation in which one o-pixel is imaged into more than one i-pixel. |
| pupil range | Pupil range of a cluster is the region of the eye sphere illuminated by that cluster through its corresponding channel. When the eye pupil intersects the pupil range of a given channel, then the image corresponding to its corresponding cluster is projected on the retina. For a practical immersive design, a pupil range comprising a circle of 15 degrees full angle on the eye sphere is sufficient. The pupil range of a multichannel system is the intersection of the pupil ranges of every channel forming the system. The boundary of the union of all accessible eye pupil positions for an average human is approximately an ellipse with angular horizontal semi-axis of 60 degs and vertical semi-axis of 45 degs relative to the front direction. |
| sub-frame slot | One of a succession of time slots into which the frame period is divided. Sub-frame slots are called by an ordinal, i.e. first sub-frame slot, second, etc. Any cluster (or channel) is an open cluster (or open channel) during one sub-frame slot at least. The image shown during a sub-frame slot is essentially constant (no time variation). |
| sub-image | An image to be shown on the virtual screen during a frame is split in several parts called sub-images. Each of these sub-images is imaged through a single channel and it is shown during one or more sub-frame slots. |
| time multiplexing | An image to be shown on the virtual screen during a frame is split into several parts called sub-images. These parts are shown in a time-division multiplexing (TDM) scheme, i.e., shown during one or more sub-frame slots of the frame time but, in general, not during the whole frame time. At the end of the frame, all the image parts have been shown at least during one sub-frame slot. |
| virtual screen | Surface, usually imaginary, containing the i-pixels, preferably being a region of the surface of a sphere concentric with the eye and with radius in the range from 2 m to infinity. When Light Field Displays are used the virtual screen is no longer a spherical static surface but the locus of the points where the rays of i-pixels converge. |
| web | Set of active o-pixels displaying information of the same i-pixel during the same sub-frame slot. During a sub-frame slot, there is a one-to-one correspondence between webs and i-pixels seen through the open channels. The channels design aims to image all the o-pixels of every web into its corresponding i-pixel. The intersection of any two webs of the same sub-frame slot is the empty set and the union of all webs plus the inactive area is the whole digital display. This implies that every active o-pixel is to be imaged onto a single i-pixel. |

BACKGROUND

1. References Cited

WO 2015/077718, published 28 May 2015, assigned PCT/US2014/067149 for "Immersive compact display glasses," referred to below as "PCT1".

WO 2016/118640, published 28 Jul. 2016, assigned PCT/US 2016/014151 for "Visual display with time multiplexing," referred to below as "PCT2".

WO 2016/118643, published 28 Jul. 2016, assigned PCT/US 2016/014155 for "Display device with total internal reflection," referred to below as "PCT3".

WO 2016/118648, published 28 Jul. 2016, assigned PCT/US 2016/014163 for "Imaging optics adapted to the human eye resolution," referred to below as "PCT6".

U.S. Pat. No. 5,390,047 to Mizukawa.

U.S. Pat. No. 6,529,331 to R. W. Massof.

US Pat. Application Publication No. US2010/0277575 A1 of Ismael et al.

U.S. Pat. No. 9,201,270 B2 to Fattal et al.

A. Brückner et al., Thin wafer-level camera lenses inspired by insect compound eyes, Opt. Exp. Vol. 18, no. 14 (2010) (("Brückner 2010").

A. Brückner, "Microoptical Multi Aperture Imaging System" Ph.D. Thesis dissertation Friedrich Schiller University, Jena, Germany, 2011 http://www.db-thueringen.de/servlets/DerivateServlet/Derivate-24992/br%C3%BCckner/dissertation_a_brueckner_Multi_Aperture_Imaging_Systems_2011_12_22.pdf ("Brückner 2011").

D. Cheng et al., *Design of a wide-angle, lightweight head-mounted display using free-form optics tiling*, Opt. Lett. 36, 2098-2100 (2011) ("Cheng 2011").

J. Duparré and R. Völkel, *Novel Optics/Micro Optics for Miniature Imaging Systems*, Proc. SPIE 6196, Photonics in Multimedia, 619607 (Apr. 21, 2006); doi:10.1117/12.662757 ("Duparré 2006").

J. E. Melzer, *Overcoming the Field of View: Resolution Invariant in Head Mounted Displays*, SPIE Vol. 3362, 1998 ("Melzer 1998").

D. Fattal, Z. Peng, T. Tran, S. Vo, M. Fiorentino, J. Brug, and R. G. Beausoleil, "A multi-directional backlight for a wide-angle, glasses-free three-dimensional display," Nature, vol. 495, 7441, pp 348-351, 2013. DOI: 10.1038/naturel 1972, ("Fattal 2013").

The disclosures of all of the above references are incorporated herein by reference in their entireties.

Head Mounted Displays

Head Mounted Display (HMD) technology is a rapidly developing area. One aspect of head mounted display technology provides a full immersive visual environment (which is described as virtual reality), such that the user only observes the images provided by one or more displays, while the outside environment is visually blocked. These devices have application in areas such as entertainment, gaming, military, medicine and industry. In US2010/0277575 A1 there is a description of one example of such a device. The basic optical function of a HMD is that of a stereoviewer such as the one described in U.S. Pat. No. 5,390,047.

A head mounted display consists typically of one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines high resolution, a large field of view, a low and well-distributed weight, and a structure with small dimensions. Although some technologies successfully achieve these desired features individually, so far no known technology has been able to combine all of them. That results in an incomplete or even uncomfortable experience for the user. Problems may include a low degree of realism and eye strain (low resolution or optics imaging quality), failure to create an immersive environment (small field of view), or excessive pressure on the user's head (excessive weight).

One approach used to increase the field of view while maintaining the resolution is tiling, i.e., using multiple displays per eye arranged in a mosaic pattern, and not in the same plane. That approach is presented in the reference "Melzer 1998" or "Cheng 2011". U.S. Pat. No. 6,529,331 also presents this solution.

Channel arrays have found considerable applications in virtual machine sensors, in the field of multi-aperture cameras. They have the capacity of increasing the field of view of the overall system while using a small focal length, which provides compactness. There are two major approaches to channel array based sensors inspired by insect eyes: (1) apposition systems and (2) superposition systems. The superposition systems use several neighboring lenses to illuminate a single sensor area, forming a single real image of the environment. In apposition systems there is no single real image formation on a surface.

There are several subtypes of apposition multi-aperture camera systems, the best known being the ones using only one pixel per channel, while in the present disclosure there is a multiplicity of pixels per channel. An example of this apposition channel array system can be found in "Brückner 2011", page 28. Another example is found in "Duparré 2006", in which also single sided toroidal channels for correcting the astigmatism are disclosed.

A second type of apposition multi-aperture camera system uses optical stitching, where each channel transfers its related part of the FOV and where adjacent partial images are optically stitched together in a way that the image details at the intersections between adjacent partial images are preserved. An example can be found in the Optical Cluster Eye in "Brückner 2011", page 75. In Brückner's system, each channel captures a non-overlapping part of the Field of View (FOV). This contrasts with the devices disclosed in PCT1, where the FOV captured by each channel overlaps with others, and does not require masks to avoid crosstalk. Brückner uses the word "optical channel" instead of channel.

A third type of apposition multi-aperture camera system uses electronic stitching of segments. In "Brückner 2010", a system using a multi-channel approach is used such that in each channel, only part of the whole FOV is recorded and a final image is created by stitching all the partial images by means of software processing. In multi-aperture cameras with electronic stitching, the pitch of the channels is always greater than the pitch of their illuminated sectors in the sensor to widen its field of view and minimize the sensor area. This implies that the input pupil of the camera is virtual, located behind the sensor, and its position and shape are not relevant and are not taken into account in the design. There is a bijective (i.e. point to point) mapping between the pixels in the sensors (called o-pixels herein) and image of these o-pixels.

PCT1 describes how to design apposition type optics for a Head Mounted Display. FIG. 1 of the present application (corresponding generally to FIG. 2 of PCT1) shows a simple example with only four clusters 104*t*, 104*b*, 105*t* and 105*b*, which form the compound image created by pixels on the digital display 107 (called o-pixels herein). Said o-pixels are projected by the channel array optics to form the image of the i-pixels or pixels on the virtual screen 108 (for simplicity this virtual screen has been drawn here flat with a rectangular contour). Every o-pixel belongs to a single cluster (the intersection of any two clusters is the empty set and the union of all clusters is the whole digital display).

Each cluster displays a portion of the image on the virtual screen. Adjacent clusters display portions of the image with a certain shift. Some parts of the image appear in more than one cluster. In order to explain why this is necessary, a two-dimensional schematic drawing has been added on top of the figure. It shows the relevant rays to define the edges of the mapping between o-pixels and i-pixels. In this drawing, the virtual screen with the i-pixels is placed at infinity, so the direction of rays 100*a*, 101*a*, 102*a* and 103*a* indicates the i-pixel positions on the virtual screen. The drawing is two-dimensional for simplicity, but the actual device that projects the image on the bottom left in FIG. 1 is three-dimensional and contains four channels, two above and two below, and not only the two shown as 104 and 105 in the schematic drawing on the top of FIG. 1. The two-dimensional scheme is used to explain the horizontal coordinates of the mapping between o-pixels and i-pixels, and an analogous reasoning applies to the vertical coordinates.

The horizontal extent of the virtual screen extends from 100*a* to 103*a*. The portion of the image represented in the left clusters 104*t* and 104*b* is given by the edge rays 100*a* and 102*a* reaching the edges of the pupil range 106, which define the vertical lines 100*a* and 102*a* on the virtual screen 108. Analogously, the portion of the image of represented in the right clusters 105*t* and 105*b* is given by the edge rays 101*a* and 103*a*, which define two vertical lines on the virtual screen 108. Therefore, the portion of the virtual screen 108 between 101*a* and 102*a* will be displayed in both left and right clusters. Specifically, channel 104 maps edge rays 100*a* and 102*a* of the virtual screen onto 100*b* and 102*b* on the digital display 107. Analogously, channel 105 maps edge rays 101*a* and 103*a* onto 101*b* and 103*b* on the digital display 107. The optical design has to guarantee that the clusters do not overlap, which is achieved with maximum use of the digital display when 101*b* and 102*b* coincide. The analogous alignment of top clusters 104*t*, 105*t* with bottom clusters 104*b*, 105*b*, is apparent from FIG. 1.

Because of the partial coincidence of the information on the clusters, i-pixel ip1 is formed by the projection of four o-pixels, op11, op12, op13 and op14. This set of o-pixels is referred to as the "web" of i-pixel ip1. Webs of i-pixels located in the center of the virtual screen, such as ip1, contain four o-pixels each. However, webs of i-pixels close to the boundaries of the virtual screen may have fewer o-pixels. For instance, the web of i-pixel ip2 contains only two o-pixels, op21 and op22, and the web of ip3 contains only op31.

PCT2 describes how to design a Head Mounted Display where an image is shown as a succession of partial real images at a rate fast enough so the human visual perception doesn't realize that there is sequence of partial images but just an image. A given image is displayed by generating that succession of partial real images, each of these representing part of the given image and together representing the given image. In general, some of the partial real images occupy overlapping positions of the full image. The partial real images are successively imaged to form a sub-image viewable from an eye position. The sub-images combine spatially and temporally to form a virtual image viewable from the eye position so that said overlapping portions of different partial real images are different portions of the virtual image. The partial real images may be displayed on a digital or other display, and imaged by means of optical channels. There is an additional light control to activate one channel or another so the real image displayed on the display can be imaged in one part of the virtual image or in another.

This ability to image the same digital display in one part or another of the virtual screen is what gives the main benefit of this strategy: to increase the i-pixel count over the o-pixel count, since an o-pixel is used several times within a frame time and in each one of these time slots the o-pixel is imaging a different i-pixel. So finally the total number of i-pixels is the number of o-pixels times the number of times it is shown through different channels minus the pixels repeated in the overlapping regions.

FIG. 6 of PCT2 shows several virtual screens (0601, 0604, 0607) containing different arrangements of subimages.

Active Shutter 3D System

An active shutter 3D system (also known as alternate frame sequencing, alternate image, AI, alternating field, field sequential or eclipse method) is a technique of displaying stereoscopic 3D images. It works by only presenting the image intended for the left eye while blocking the right eye's view, then presenting the right-eye image while blocking the left eye, and repeating this so rapidly that the interruptions do not interfere with the perceived fusion of the two images into a single 3D image.

Modem active shutter 3D systems generally use liquid crystal shutter glasses (also called "LC shutter glasses" or "active shutter glasses"). Each eye's glass contains an LC cell between crossed polarizers. This LCD structure has the property of becoming opaque or transparent depending on the signal received. The glasses are controlled by a timing signal that allows the glasses to alternately block one eye, and then the other, in synchronization with the refresh rate of the screen. The timing synchronization to the video equipment may be achieved via a wired signal, or wirelessly by either an infrared or radio frequency (e.g. Bluetooth, DLP link) transmitter. Historic systems also used spinning discs, for example the Teleview system.

Active shutter 3D systems are used to present 3D films in some theaters, and they can be used to present 3D images on CRT, plasma, LCD, projectors and other types of video displays.

SUMMARY

Display glasses use a single digital display which is shared among both eyes by means of Time Division Multiplexing (TDM) in the present application. Conventional display glasses using a single digital display have to either split the display in two regions, each one of them devoted to a single eye, or to send the same image to both eyes. In the former case, the pixels available for each eye are halved. In the latter case stereoscopic vision is not possible, deteriorating the immersive environment. The solution given in the present application allows stereoscopic vision while using up to the total pixel count for each one of the eyes if the switching time is fast enough.

The display sharing among both eyes could be complete (any part of the display is alternatively used for one eye and the other one) or partial (there are parts of the display which are shared with TDM among both eyes, but there other parts which are dedicated to a single eye). The image on each eye retina is shown as a succession of sub-images, each sub-image being shown during a fraction of the frame time called a sub-frame slot. The union of all sub-frame slots is the frame display time and the union of all sub-images forms one full image per eye, which is shown on the virtual screen. The sub-images may overlap in space, unlike sub-frame slots which have no intersection in time. The optics collecting the light from the digital display is divided in different channels; each channel is assigned to a single eye and typically corresponds to a single sub-frame slot and a single subimage. Every optical channel images its cluster (which can be the full digital display or a portion of it), into its subimage. This requirement implies, in general, asymmetric configurations for each optical channel; and since these asymmetries benefit from free-form optical designs (i.e. designs that don't have rotational nor translational symmetry), the optical devices described in the present application are in general free-form. The optics may be composed of elements devoted to a single eye and/or optical elements used by both eyes.

During a sub-frame slot, only a set of channels called a channel bundle is sending images to the eyes. The light from the remaining channels is blocked or deviated before reaching the pupil ranges of the eyes, i.e., before reaching the region of the eye where the eye pupil may be found.

BRIEF DESCRIPTION OF THE DRAWINGS

The above and other aspects, features and advantages will be apparent from the following more particular description of certain embodiments, presented in conjunction with the following drawings.

FIG. 8 is a flowchart of an example method of generating image data for a display device, according to an embodiment.

DETAILED DESCRIPTION

Unlike the head mounted displays (HMD) described in PCT2 which use one display per eye, the HMDs described henceforth use a single display which is shared between both eyes. Unlike more conventional HMD using a single display, the HMDs described henceforth use a display which is not only shared spatially between both eyes but also temporally. This time sharing of the single display between both eyes is the most relevant innovation of the present application.

Figure 1:
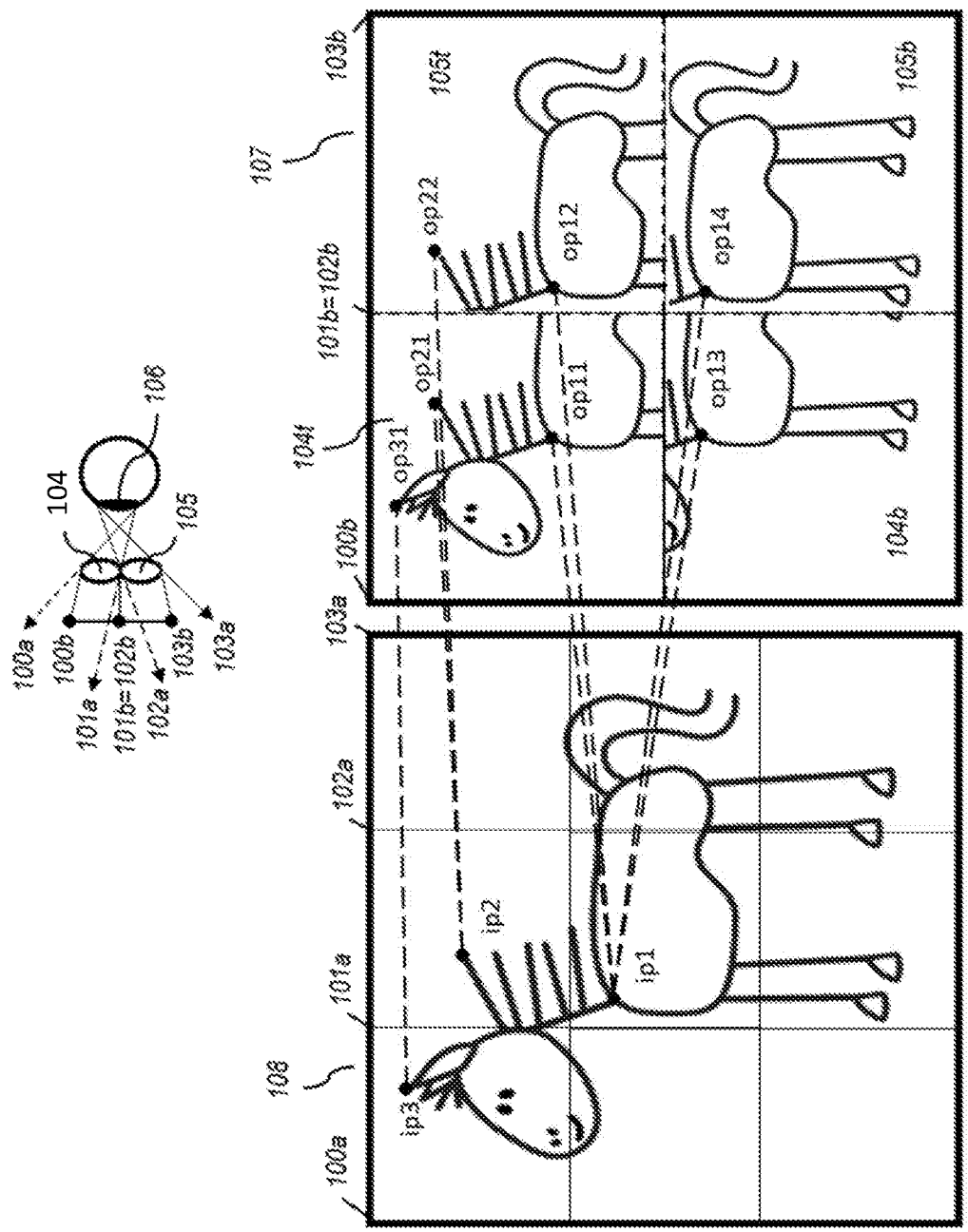
FIG. 1 is a diagram of example apposition type optics for a Head Mounted Display, according to an embodiment.
Figure 2A:
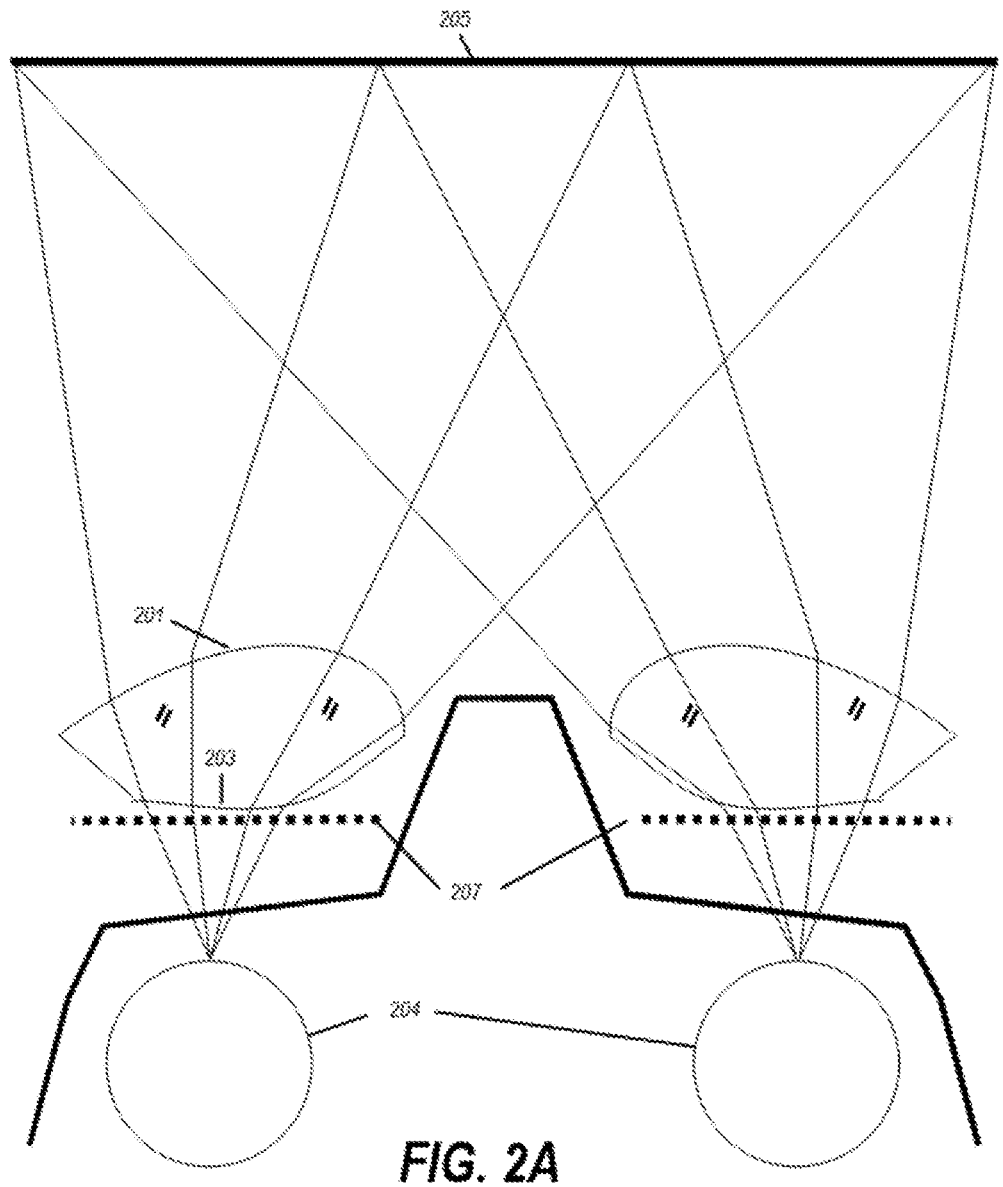
FIG. 2A is a diagram of an example horizontal cross-section of a configuration having a full display that is temporarily shared between both eyes and two free-form lenses, according to an embodiment.

FIG. 2A shows a schematic horizontal cross-section of one possible configuration in which the full display 205 is temporarily shared between both eyes 204 as in an active shutter 3D system. The shutters 207 alternately block the light emitted to one eye while allowing the light to reach the other eye. During a sub-frame slot only a set of channels referred to as a channel bundle should be sending images to the eyes. To avoid the remaining channels lighting the eyes within the corresponding pupil ranges, a directional backlight can be used (see, for instance, U.S. Pat. No. 9,201,270 B2, "Fattal 2013" and "Wezstein 2012") together with an LCD as digital display. When the angular emission pattern of the digital display cannot be switched, such as in OLED displays or in LCD displays using non-directional backlights, then an electronic shutter at the entrance (or at the light path) of each channel can be used to block the light from passing through undesired channels. Light going through a wrong channel may create ghost sub-image. An electronic shutter can be made of a ferroelectric liquid crystal (FLC). A ferroelectric liquid crystal is advantageous because of its fast switching time which is typically below 100 μs.

Figure 2B:
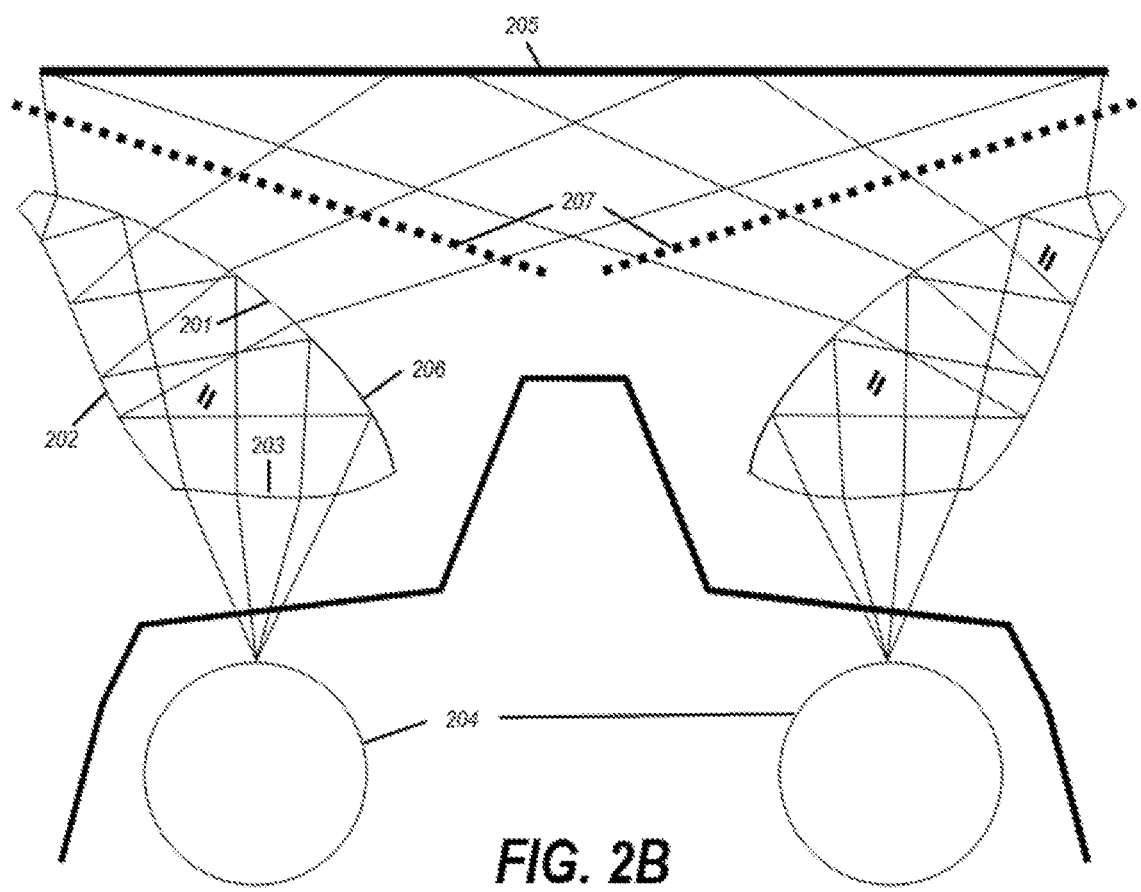
FIG. 2B is a diagram of an example horizontal cross-section of a configuration having a full display that is temporarily shared between both eyes and two free-form lenses and having two free-form prisms, according to an embodiment.

In this scheme the optics must be free-form if the HMD has to have a relatively compact size and a reasonable optical imaging quality. FIG. 2A shows two free-form lenses (one per eye) as the optical system, while FIG. 2B shows an optical system formed by two free-form prisms (one per eye) similar to those disclosed in PCT3. Each of these prisms is formed by a single dielectric piece surrounded by surfaces 201, 202, 203 and 206. Light coming from the display 205 and crossing the shutter 207 (during the corresponding sub-frame time slot) is refracted by surface 201, reflected by surface 202, reflected again by surfaces 201 or 206 and finally refracted by surface 203 to be imaged on the retina after passing through the eye. Surfaces 202 and 206 are covered by a metallic coating to form metallic reflectors. Reflection at surface 201 is achieved by total internal reflection.

Figure 3:
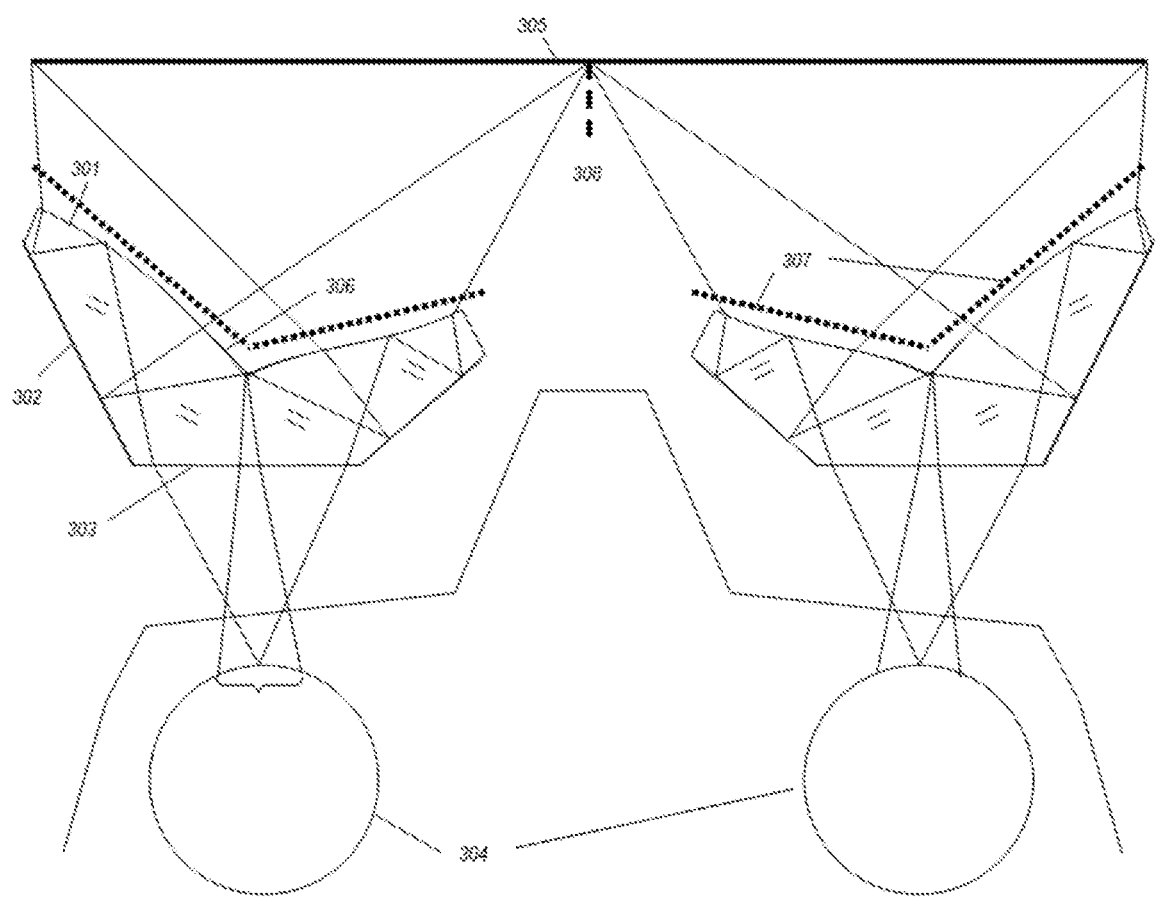
FIG. 3 is a diagram of an example horizontal cross-section of a configuration having a full display that divided into two parts, according to an embodiment.

FIG. 3 shows a schematic horizontal cross section of another possible configuration in which the display 305 is divided in two parts (left and right) by the middle line 308. Each one of the two parts is devoted to a single eye and contains clusters which are time multiplexed. This configuration can be considered an application of PCT2 in which the left and right display are placed coplanar and adjacent one to the other to form a single display.

In FIG. 3 there are four clusters, two per eye, and the clusters of the same eye share the same portion of the physical display which is time multiplexed. This device is in fact similar to a combination of devices described in PCT2 and PCT3, which are incorporated herein by reference in their entireties.

Between the cases of 2A and 2B (where the full display is used sequentially for both eyes) and FIG. 3 (where there are no parts of the display used for both eyes) there are intermediate designs in which portions of the digital display are temporarily shared between both eyes, i.e., clusters of different sub-frame slots may correspond to different eyes even though they use the same portion of the display.

Figure 4:
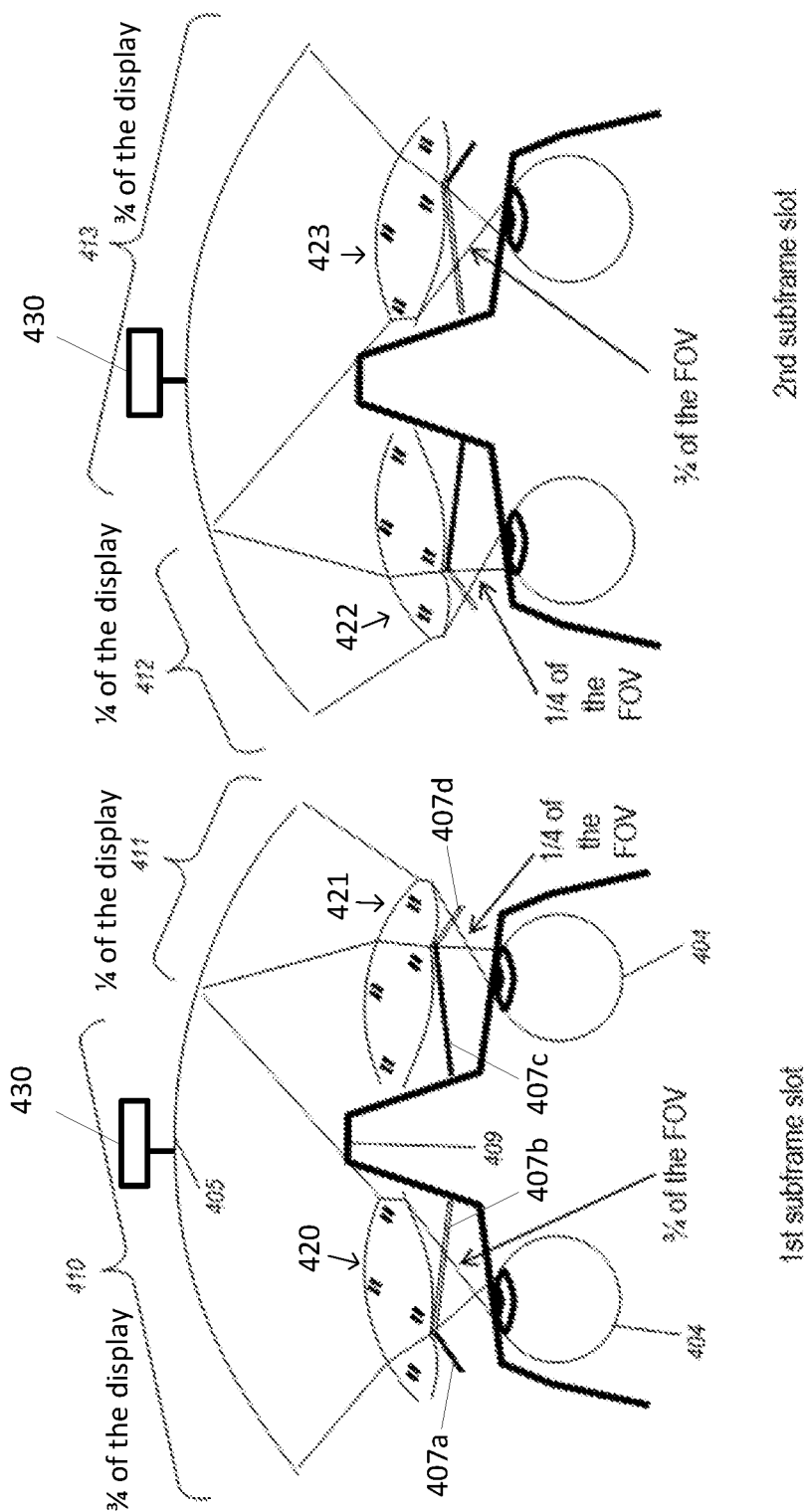
FIG. 4A and FIG. 4B are diagrams of an example horizontal cross-section of a configuration of a display having curved cylindrical shape with a vertical cylinder axis, according to an embodiment.

This is the case shown in FIGS. 4A and 4B. In this case a display device 400 includes a display 405 that is curved in a cylindrical shape with a vertical cylinder axis. The display device 400 also includes shutters 407, display driver 430, and one or more optical elements, such as mirrors, lenslets, and/or prisms. FIGS. 4A and 4B show a schematic top view of a horizontal cross section where the circles 404 represent the human eyes and 409 the nose. The time multiplexing configuration of this arrangement contains two identical subframe slots for each frame time. FIG. 4A shows the open channels and clusters during the first subframe slot and FIG. 4B shows the open channels and clusters during the second subframe slot. For simplicity, this example assumes no variable focal length across the field of view (FOV) unlike the cases referred in PCT6.

The example of FIGS. 4A and 4B contains four clusters for both eyes. These four clusters are grouped in two pairs according to the subframe slot when they appear, i.e., there are two optical channel bundles. For example, a first optical channel bundle includes cluster 410 and cluster 411 and a second optical channel bundle includes cluster 412 and cluster 413. Clusters 410, 411, 412, and 413 correspond to channels 420, 421, 422, and 423, respectively. The union of the two clusters of any one of these channel bundles occupy the full display 405. During the first subframe slot (FIG. 4A) the cluster 410 corresponding to the left eye is substantially bigger than the cluster 411 of the right eye. During the next subframe slot (FIG. 4B) this situation is reversed and the biggest cluster 413 corresponds to the right eye while the smallest cluster 412 is sent to the left eye. The union of all clusters of the same subframe slot (for instance 410 together with 411) occupies the full display 405. The open channels and clusters are defined by the state of the shutters 407. For example, shutters 407a and 407c are closed and shutters 407b and 407d are open during the first subframe slot (FIG. 4A), while shutters 407a and 407c are open and shutters 407b and 407d are closed during the second subframe slot (FIG. 4B). Although shutters 407a, 407b, 407c, and 407d are shown as separate shutters in the embodiment of FIGS. 4A and 4B, in other embodiments, two or more of the shutters are provided as portions of a larger shutter having separately controllable portions (e.g., one shutter per eye, the shutter including shutter portions 407a and 407b).

Because in this example the focal length of the optics is constant across the FOV, the sizes of the subimages are proportional to the clusters sizes. A non-constant focal length strategy as described in PCT6 can be applied to further increase the resolution and consequently, causes the proportionality of subimage size to cluster size to be broken.

In the example of FIGS. 4A and 4B, time multiplexing allows the use of the central part of the display 405 for both eyes, which simplifies the optical design. In other words, a sub-image from the channel 420 and a sub-image from the channel 422 combine to form a first virtual image (e.g., for the left eye), while a sub-image from the channel 421 and a sub-image from the channel 423 combine to form a second virtual image (e.g., for the right eye). Each of the virtual images is viewable from an eye position (e.g., left or right eye positions) so that different optical channel bundles image a same portion of the display (i.e., the center portion) to different portions of the two virtual images.

Figure 5:
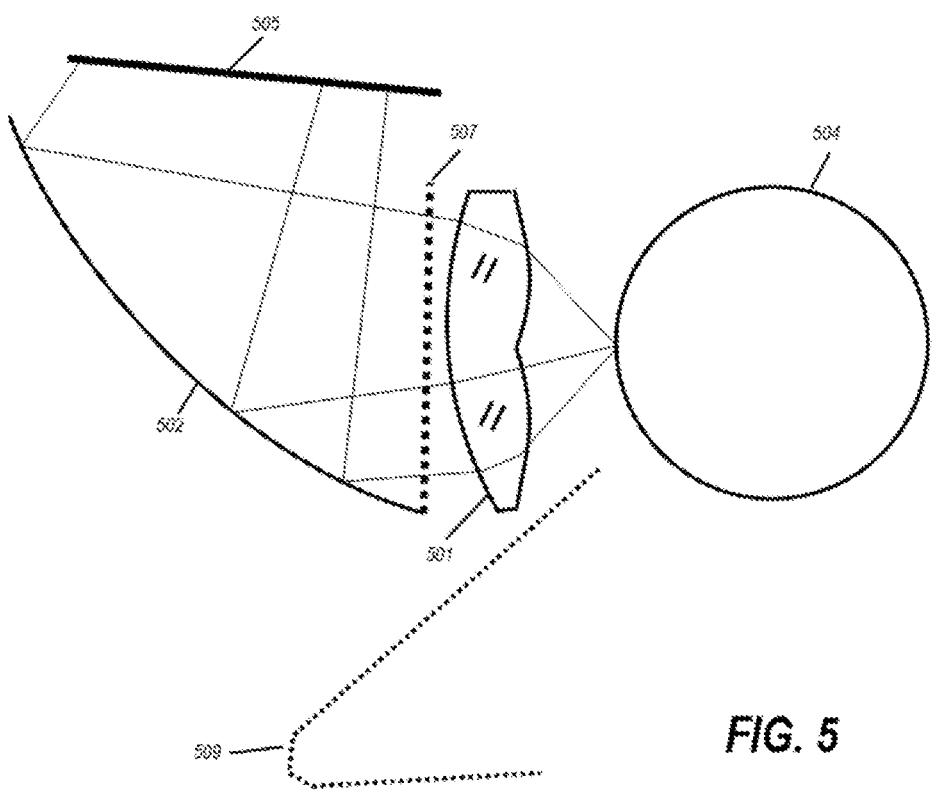
FIG. 5 is a diagram of an example vertical cross-section of a configuration of a display that is arranged horizontally, according to an embodiment.

FIG. 5 shows a schematic vertical cross section of another example. The circle 504 represents the eye globe and 509 the nose. The display 505 is set horizontally and the shutters 507 vertically. The optics are formed by components devoted to a single eye (e.g., lenslet 501) and components shared by both eyes (e.g., curved mirror 502).

Figure 6:
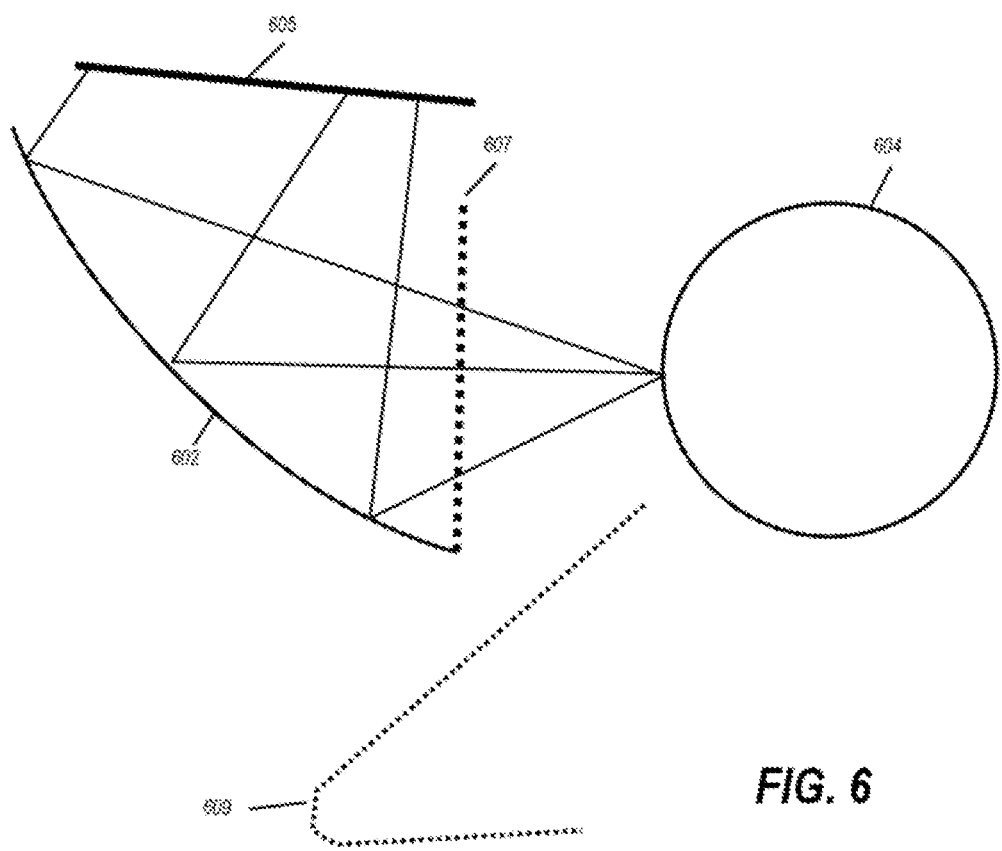
FIG. 6 is a diagram of an example vertical cross-section of a configuration of a display that is arranged horizontally and having a shared optical element, according to an embodiment.

FIG. 6 shows a similar case to that of FIG. 5 excepting that the optics only contain elements which are shared among both eyes (e.g., curved mirror 602).

Sub-images of different channels overlap, in general. This overlapping does not mean that these regions are seen brighter than the non-overlapping ones, even though these regions are displayed during more than one sub-frame slot. This is because the perceived brightness only depends on the brightness of the o-pixels, the optical efficiency, the fraction of subframe slot time over the frame time, and the cross section of the illuminated part of the eye pupil. This cross section depends on the relative position of the channel optics and the gazing direction of the eye for the overlapping regions of the sub-images, but in a well-designed device according to PCT1 the contribution of the different channels to this cross-section makes the total amount of illuminated part of the pupil constant.

Figure 7:
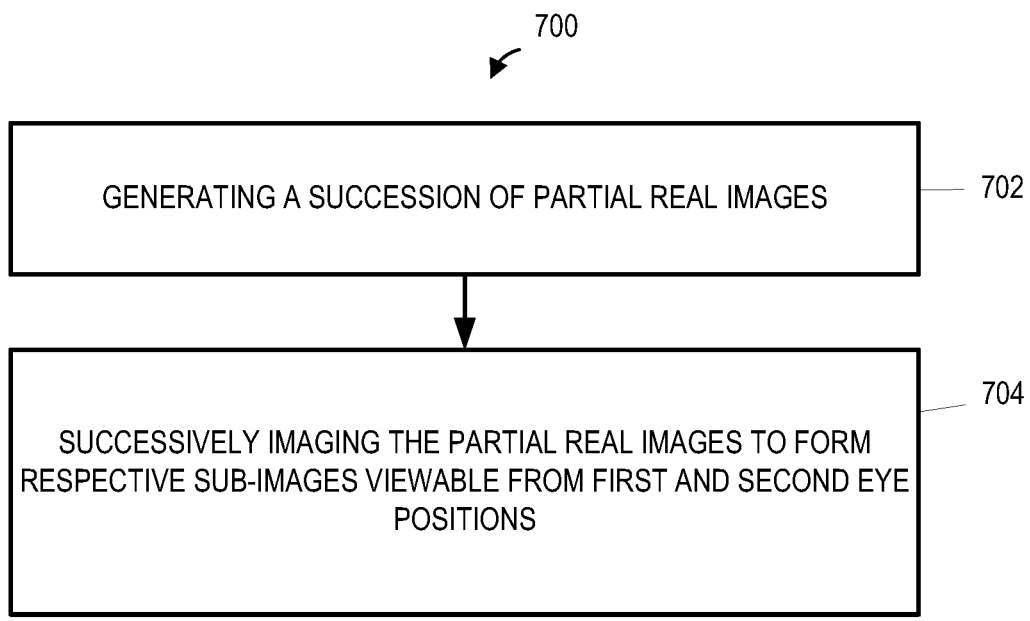
FIG. 7 is a flowchart of an example method of displaying two given images, according to an embodiment.

FIG. 7 is a flowchart of an example method 700 of displaying two given images, according to an embodiment. The method 700 is implemented by the display driver 430, in an embodiment.

At block 702, a succession of partial real images are generated. Each partial real image represents part of the given images and together represent the two given images. At least some of the partial real images belong to different given images occupying spatially overlapping positions.

At block 704, the partial real images are successively imaged to form respective sub-images, each sub-image being viewable from one eye position of two eye positions. The sub-images combine spatially to form two virtual images, each of the two virtual images being viewable from a different one of the two eye positions so that spatially overlapping portions of different partial real images form different portions of the two virtual images.

In an embodiment, successively imaging the partial real images comprises successively imaging sets of simultaneously displayed partial real images, wherein at least one of said sets comprises a plurality of non-overlapping partial real images.

In an embodiment, successively imaging comprises successively causing or permitting light to flow through selected ones of a plurality of optical channels from the display to the two eye positions and preventing a flow of light through other selected ones of the plurality of optical channels from the display to two pupil ranges each pupil range corresponding to one of the two eye positions.

In an embodiment, successively causing or permitting light to flow comprises operating shutters to selectively prevent light from flowing through associated ones of the optical channels.

In an embodiment, the causing or permitting light to flow comprises controlling a direction in which light flows to or from selected portions of the real image.

In an embodiment, the optical channels comprise lenslets forming the sub-images from the partial real images.

In an embodiment, the method 700 further includes forming the real image on a digital display comprising object pixels, grouping the object pixels into clusters of contiguous pixels, causing each cluster to form a partial real image associated with a lenslet belonging to one of the optical channels, and grouping at least some object pixels into more than one cluster at different times, according to which of the respective optical channels is active.

In an embodiment, successively imaging comprises permitting light to flow cyclically in a repeating sequence through i) the selected ones of the plurality of channels, and ii) the other selected ones of the plurality of optical channels.

In an embodiment, the method 700 further comprises generating the succession of partial real images on a display, so that at least one of the partial real images occupies substantially a whole active area of the display.

In an embodiment, the method 700 further comprises generating the succession of partial real images on a display, so that at least two of the partial real images occupy non-overlapping portions of the display, and successively imaging comprises imaging said two partial real images at the same time.

In an embodiment, the method 700 further comprises receiving two input images, defining parts of said input images as partial input images each assigned to a position, and generating said partial input images as said partial real images so positioned that the corresponding sub-images align to form uninterrupted virtual images of the input images.

In an embodiment, receiving two input images comprises: receiving two input videos, comprising generating for each of a succession of images of the input videos said partial real images each so positioned that the corresponding sub-images align to form uninterrupted virtual images of the input images; displaying the video by displaying the images of the input videos in succession; and displaying each of the images of the input video by displaying the partial real images of that image of the input video in succession.

In an embodiment, the method 700 further comprises directing the light from the sub-images to two pupil ranges each one of the pupil ranges comprising an area on the surface of an imaginary sphere, at one of the two eye positions, of from 21 to 27 mm diameter, the pupil range including a circle subtending 15 degrees whole angle at the center of the sphere.

FIG. 8 is a flowchart of an example method 800 of generating image data for a display device, according to an embodiment. In an embodiment, the display device is the display 405. The method 800 is implemented by the display driver 430, in an embodiment.

At block 802, two input images are received.

At block 804, partial images corresponding to parts of the input images are generated.

At block 806, positions are assigned to the partial images, at least some of the positions of two partial images corresponding to different input images overlapping. The positions are assigned so that if each partial image is successively displayed at its assigned position, and imaged to a virtual sub-image by a respective one of a plurality of channels of a suitably configured display device (e.g., the display device 400), the virtual sub-images combine to form uninterrupted virtual images of the input images.

According to an embodiment, a display device includes a display, operable to generate a real image, and an optical system. The optical system includes a plurality of optical channel bundles, each of the optical channel bundles comprising one or more channels, each of the channels comprising a lenslet arranged to generate a sub-image from a respective partial real image on the display associated with that channel, where each lenslet is configured to project light from the display to a corresponding eye position among two eye positions. The sub-images combine to form two virtual images, each of the virtual images viewable from an eye position of the two eye positions so that different optical channel bundles image a same portion of the display to different portions of the two virtual images. The optical system further includes a light switching system configured to allow a flow of light through selected ones of the channels from the display to pupil ranges of the eye positions and to prevent a flow of light through other selected ones of the channels from the display to the pupil ranges. The light switching system is configured to successively open the optical channel bundles to allow light to flow successively through the corresponding channels and, while each of the optical channel bundles is open, the display is arranged to display one or more partial real images associated with the channels of the corresponding optical channel bundle.

In an embodiment, at least one of the partial real images occupies substantially a whole active area of the display.

In an embodiment, at least two of the partial real images occupy non-overlapping portions of the display, and the display is arranged to display those two partial real images, and to open parts of the optical system associated with the union of the displayed partial real images, at the same time as a single optical channel.

In an embodiment, the light switching system comprises shutters operative to selectively prevent light from flowing through associated ones of the channels.

In an embodiment, the light switching system is operative to control a direction in which light flows to or from selected portions of the display.

In an embodiment, each of the plurality of optical channel bundles is arranged to be opened, and the respective one or more partial real images to be displayed, cyclically in a repeating sequence.

In an embodiment, at least one optical channel bundle includes two or more lenslets in parallel that image one spatially continuous portion of the display to one spatially continuous virtual sub-image.

In an embodiment, the display device further includes an image generator operative to receive two input images, to generate partial input images each assigned to a partial real image position on the display so that upon displaying the generated partial input images as said partial real images the corresponding sub-images align to form uninterrupted virtual images of the input images, wherein at least some of the partial real image positions overlap and contain partial real images that in those positions would not form part of a single uninterrupted image on the display.

In an embodiment, the image generator is operative to receive two input videos, and to generate, for each of a succession of images of the input videos, partial real images each so positioned on the display that the corresponding sub-images align to form uninterrupted virtual images of the input images. The videos are displayed on the display device by displaying the images of the input videos in succession, and each of the images of the input videos is displayed by displaying the partial real images of that image of the input videos in succession.

In an embodiment, all the optical channels are aligned to direct the light from their respective sub-images to one of two pupil ranges each of them comprising an area on the surface of an imaginary sphere, at one of the two eye positions, of from 21 to 27 mm diameter, the pupil range including a circle subtending 15 degrees whole angle at the center of the sphere.

In an embodiment, the display is a digital display including object pixels, wherein the object pixels are grouped into clusters of contiguous pixels, each cluster forming a partial real image and associated with a respective lenslet that belongs to one of the channels, wherein at least some object pixels belong to more than one cluster at different times, according to which of the respective channels is active.

In an embodiment, substantially all imaging light rays falling on one of said pupil ranges through a given lenslet come from an associated partial real image, and substantially all said imaging light rays falling on said pupil range from the associated partial real image pass through the associated lenslet.

In an embodiment, substantially all imaging light rays exiting a given lenslet towards one of the pupil ranges and virtually coming from any one position of the virtual image are generated from a single position of the associated partial real image.

In an embodiment, a headgear includes a display device as described above, with a mount for positioning the display device on a human head with the eye position of the display device coinciding with an eye of the human.

In an embodiment, a non-transitory computer readable storage device containing computer readable data representing a plurality of partial images of two input images and positions for the partial images, at least some of the positions of two partial images corresponding to different input images overlapping, so that if each partial image is successively displayed at its assigned position, and imaged to a virtual sub-image by a respective one of a plurality of channels of a suitably configured display device, the virtual sub-images combine to form uninterrupted virtual image of the input images.

The display device may further comprise a mounting operative to maintain the device in a substantially constant position relative to a normal human head with each eye at the center of the imaginary spheres formed by the virtual screens.

There may also be a display driver 430 operative to cause the display to display objects such that the two virtual images combine to form a single image when viewed by a human observer with eyes at the center positions of the respective imaginary spheres. The display driver 430 includes a processor (e.g., a central processing unit or suitable electrical circuits) and a memory for storing program data to be executed by the processor.

The mounting may include mounting features to hold corrective lenses in front of users' eyes with a defect of vision.

The display may be of the type called Light Field Displays (F. Huang, K. Chen, G. Wetzstein. "The Light Field Stereoscope: Immersive Computer Graphics via Factored Near-Eye Light Field Displays with Focus Cues", ACM SIG- GRAPH (Transactions on Graphics 33, 5), 2015), the disclosure of which is incorporated herein by reference in its entirety, in particular those implemented by stacked transmissive LCDs. An LFD with just two stacked LCDs with a separator among them has a small thickness and is very attractive. Light Field Displays support focus cues which, together with the rest of the device, help to solve the vergence-accommodation conflict at a reasonable cost and volume. This conflict may lead to visual discomfort and fatigue, eye strain, diplopic vision, headaches, nausea, compromised image quality, and it may even lead to pathologies in the developing visual system of children. These cascaded displays can also be used to just increase the density of opixels (spatial resolution). In particular, F. Heide, D. Lanman, D. Reddy, J. Kautz, K. Pulli, D. Luebke, *Cascaded Displays: Spatiotemporal Superresolution using Offset Pixel Layers* doi:10.1145/2601097.2601120, the disclosure of which is incorporated herein by reference in its entirety, showed that a dual-layer display can quadruple the apparent spatial resolution and double the effective refresh rate. The spatial resolution as well the depth of field can be increased even more when the eye is tracked (and the displayed information is restricted to that viewer position) as explained in A. Maimone, R. Chen, H. Fuchs, R. Raskar, G. Wetzstein. "Wide Field of View Compressive Light Field Display using a Multilayer Architecture and Tracked Viewers", Journal of the Society for Information Display, 2015, the disclosure of which is incorporated herein by reference in its entirety.

The display device may further comprise one or more of a sound producing device, and/or a camera and a display driver operative to reproduce on the display an image captured by the camera, or two of either or each to provide stereoscopic sound or vision.

The device may further comprise a head-tracking device and a display driver operative to reproduce on the display an image fixed to the physical ground.

The display device may further comprise a system to adjust the distance from the optics to the digital display or to the other optics to compensate for interpupillary distance and/or defects of vision of the user.

The device may further comprise an eye-tracking device and a display driver operative to reproduce on the display an image which, when seen through the optics, is recognizable at the eye position detected by the eye-tracking device but not necessarily at other eye's positions.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent

We claim:

1. A display device comprising:
a display, operable to generate a real image; and
an optical system, comprising a plurality of optical channel bundles, each of the optical channel bundles comprising one or more channels, each of the channels comprising a lenslet arranged to generate a sub-image from a respective partial real image on the display associated with that channel, where each lenslet is configured to project light from the display to a corresponding eye position among two eye positions;
wherein the sub-images combine to form two virtual images, each of the virtual images corresponding to an eye position of the two eye positions distinct from the other virtual image, each of the virtual image viewable from its respective eye position so that different optical channel bundles image a same portion of the display to different portions of the two virtual images;
the optical system further comprising a light switching system configured to allow a flow of light through selected ones of the channels from the display to pupil ranges of the eye positions and to prevent a flow of light through other selected ones of the channels from the display to the pupil ranges;
wherein all imaging light rays falling on one of said pupil ranges through a given lenslet come from an associated partial real image, and all said imaging light rays falling on said pupil range from the associated partial real image pass through the associated lenslet; and
wherein the light switching system is configured to successively open the optical channel bundles to allow light to flow successively through the corresponding channels and, while each of the optical channel bundles is open, the display is arranged to display one or more partial real images associated with the channels of the corresponding optical channel bundle.

2. The display device of claim 1, wherein at least one of the partial real images occupies a whole active area of the display.

3. The display device of claim 1, wherein at least two of the partial real images occupy non-overlapping portions of the display, and the display is arranged to display those two partial real images, and to open parts of the optical system associated with the union of the displayed partial real images, at the same time as a single optical channel.

4. The display device of claim 1, wherein the light switching system comprises shutters operative to selectively prevent light from flowing through associated ones of the channels.

5. The display device of claim 1, wherein the light switching system is operative to control a direction in which light flows to or from selected portions of the display.

6. The display device of claim 1, wherein each of the plurality of optical channel bundles is arranged to be opened, and the respective one or more partial real images to be displayed, cyclically in a repeating sequence.

7. The display device of claim 1, wherein at least one optical channel bundle comprises two or more lenslets in parallel that image one spatially continuous portion of the display to one spatially continuous virtual sub-image.

8. The display device of claim 1, further comprising an image generator operative to receive two input images, to generate partial input images each assigned to a partial real image position on the display so that upon displaying the generated partial input images as said partial real images the corresponding sub-images align to form uninterrupted virtual images of the input images, wherein at least some of the partial real image positions overlap and contain partial real images that in those positions would not form part of a single uninterrupted image on the display.

9. The display device of claim 8, wherein:
the image generator is operative to receive two input videos, and to generate, for each of a succession of images of the input videos, partial real images each so positioned on the display that the corresponding sub-images align to form uninterrupted virtual images of the input images; and
wherein the videos are displayed on the display device by displaying the images of the input videos in succession, and each of the images of the input videos is displayed by displaying the partial real images of that image of the input videos in succession.

10. The display device of claim 1, wherein all the optical channels are aligned to direct the light from their respective sub-images to one of two pupil ranges each of them comprising an area on the surface of an imaginary sphere, at one of the two eye positions, of from 21 to 27 mm diameter, the pupil range including a circle subtending 15 degrees whole angle at the center of the sphere.

11. The display device of claim 1, wherein the display is a digital display comprising object pixels, wherein the object pixels are grouped into clusters of contiguous pixels, each cluster forming a partial real image and associated with a respective lenslet that belongs to one of the channels, wherein at least some object pixels belong to more than one cluster at different times, according to which of the respective channels is active.

12. The display device of claim 1, wherein all imaging light rays exiting a given lenslet towards one of the pupil ranges and virtually coming from any one position of the virtual image are generated from a single position of the associated partial real image.

13. A headgear comprising the display device of claim 1, with a mount for positioning the display device on a human head with the eye position of the display device coinciding with an eye of the human.

14. A method of displaying two given images, comprising:
generating a succession of partial real images, each representing part of the given images and together representing the two given images, and at least some of the partial real images belonging to different given images occupying spatially overlapping positions; and
successively imaging the partial real images to form respective sub-images, each sub-image being viewable from one eye position of two eye positions;
wherein the sub-images combine spatially to form two virtual images, each of the two virtual images corresponding to a different one of the two eye positions distinct from the other sub-image, each of the sub-images viewable from its respective eye position so that spatially overlapping portions of different partial real images form different portions of the two virtual images;
further comprising:
receiving two input videos, comprising generating for each of a succession of images of the input videos said partial real images each so positioned that the corresponding sub-images align to form uninterrupted virtual images of the input images;
displaying the video by displaying the images of the input videos in succession; and
displaying each of the images of the input video by displaying the partial real images of that image of the input video in succession.

15. The method of claim 14, wherein successively imaging the partial real images comprises successively imaging sets of simultaneously displayed partial real images, wherein at least one of said sets comprises a plurality of non-overlapping partial real images.

16. The method of claim 14, wherein successively imaging comprises successively causing or permitting light to flow through selected ones of a plurality of optical channels from the display to the two eye positions and preventing a flow of light through other selected ones of the plurality of optical channels from the display to two pupil ranges each pupil range corresponding to one of the two eye positions.

17. The method of claim 16, wherein the successively causing or permitting light to flow comprises operating shutters to selectively prevent light from flowing through associated ones of the optical channels.

18. The method of claim 16, wherein the causing or permitting light to flow comprises controlling a direction in which light flows to or from selected portions of the real image.

19. The method of claim 16, wherein the optical channels comprise lenslets forming the sub-images from the partial real images.

20. The method of claim 16, further comprising:
forming the real image on a digital display comprising object pixels, grouping the object pixels into clusters of contiguous pixels,
causing each cluster to form a partial real image associated with a lenslet belonging to one of the optical channels, and
grouping at least some object pixels into more than one cluster at different times, according to which of the respective optical channels is active.

21. The method of claim 16, wherein the successively imaging comprises permitting light to flow cyclically in a repeating sequence through i) the selected ones of the plurality of channels, and ii) the other selected ones of the plurality of optical channels.

22. The method of claim 14, comprising generating the succession of partial real images on a display, so that at least one of the partial real images occupies a whole active area of the display.

23. The method of claim 14, comprising generating the succession of partial real images on a display, so that at least two of the partial real images occupy non-overlapping portions of the display, and successively imaging comprises imaging said two partial real images at the same time.

24. The method of claim 14, further comprising receiving two input images, defining parts of said input images as partial input images each assigned to a position, and generating said partial input images as said partial real images so positioned that the corresponding sub-images align to form uninterrupted virtual images of the input images.

25. The method of claim 14, comprising directing the light from the sub-images to two pupil ranges each one of the pupil ranges comprising an area on the surface of an imaginary sphere, at one of the two eye positions, of from 21 to 27 mm diameter, the pupil range including a circle subtending 15 degrees whole angle at the center of the sphere.

26. A method of generating image data for the display device of claim 1, comprising:
   receiving two input images;
   generating partial images corresponding to parts of the input images; and
   assigning positions to the partial images, at least some of the positions of two partial images corresponding to different input images overlapping;
   so that if each partial image is successively displayed at its assigned position, and imaged to a virtual sub-image by a respective one of a plurality of channels of the display device of claim 1, the virtual sub-images combine to form uninterrupted virtual images of the input images.

27. A non-transitory computer readable storage device associated with the display device of claim 1, containing computer readable data representing a plurality of partial images of two input images and positions for the partial images, at least some of the positions of two partial images corresponding to different input images overlapping,
   so that if each partial image is successively displayed at its assigned position, and imaged to a virtual sub-image by a respective one of a plurality of channels of a suitably configured display device according to claim 1, the virtual sub-images combine to form uninterrupted virtual image of the input images.

* * * * *